G. L. LAFLIN.
Whip-Sockets.
No. 155,380. Patented Sept. 29, 1874.
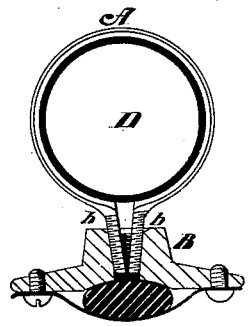
Fig I.
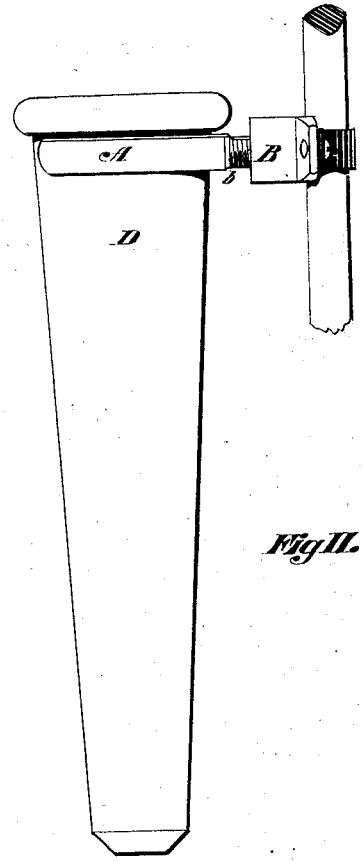
Fig II.
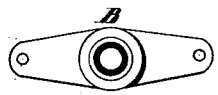
Fig III.
Witnesses
E Dudley Chafin
H. D. Knowles Jr.
Inventor
Geo L. Laflin
by his Attorneys
Gardiner & Hyde
THE GRAPHIC CO. PHOTO-LITH. 39 & 41 PARK PLACE, N.Y.

UNITED STATES PATENT OFFICE.

GEORGE L. LAFLIN, OF WESTFIELD, MASSACHUSETTS.

IMPROVEMENT IN WHIP-SOCKETS.

Specification forming part of Letters Patent No. 155,380, dated September 29, 1874; application filed June 13, 1874.

*To all whom it may concern:*

Be it known that I, GEORGE L. LAFLIN, of Westfield, Hampden county, State of Massachusetts, have invented an Improvement in Whip-Socket Fasteners, of which the following is a specification:

My invention consists in constructing the clamping-band that embraces and holds the socket to present a screw-shank formed by screw-sections upon separate ends of the clamp itself, the said screw-shank being recessed within the base for holding the dash-rail, as within a nut, so that any movement of this base upon the screw-sections operates to release or more tightly bind the whip-socket.

In the drawings, Figure I shows a partial section view. Fig. II shows a fastener as applied to a conical socket, Fig. III being a detail view.

The binding-band A, formed of metal having the requisite degree of elasticity, is placed over the socket D and drawn around it by the nut-base B, run over the screw-sections $b\ b$. These sections, from their point of contact at their ends within the nut B, depart from each other toward the socket D to be drawn together by the action of the nut in tightening the band A, and in order to economize room and enable a part of the space between the sections to be within the nut-base B, and for another purpose hereinafter described, I form the thread in the base B upon a conical aperture, and its entire inner surface bears upon the sections to compress them.

In grasping a cylindrical socket, except for the facility of adjustment, there is no necessity of the band A being in two pieces, as the flexibility of band A would permit it to be drawn tightly by the nut and section ends; but in order that the same socket-fastener may be used interchangeably with a conical or cylindrical socket, I cut the band end A into two parts, as seen in Fig. II, and the conical inner face of the nut enables the halves of the band A to conform to the conical sides of the socket, while the section ends $b\ b$ are still received within and drawn together by the base B with the same result, as in a cylindrical barrel, of securely holding the socket.

The fastener is first secured to the socket, and then clamped to the dash-rod to connect the socket to the vehicle.

I am aware that various devices have been used for clamping and uniting a whip-socket to the dash-rod, and that an expanding-clamp for that purpose is not new. I therefore do not wish to be understood as broadly claiming such principle, but confine myself to the specific device, as shown and described, by which the various advantages heretofore particularized are obtained—*i. e.*, making a draw-nut of the base that comes against the dash-bar; making the section ends $b\ b$ to be received within the base B, so that the space that can be taken up lies within the base between the sections $b\ b$, to thus enable the socket to be brought close to the dash; and the formation of the nut of a conical form, so that the clamp A, when in two parts, may be swung to conform to the sloping side of a socket, and have its section ends received within the nut-base B.

Now, having described my invention, what I claim is—

A whip-socket fastener, consisting of the draw-band A, having the screw-sections $b\ b$, in combination with a screw-base, B, substantially as and for the purpose shown and described.

GEORGE L. LAFLIN.

Witnesses:
LORING P. LANE,
FRANK S. EWING.